Dec. 6, 1949 — R. R. SNYDER — 2,490,554
TRANSMISSION OF ROTARY MOTION BY SINGLE HOMOPOLAR DYNAMOELECTRIC MACHINE
Filed Nov. 29, 1946
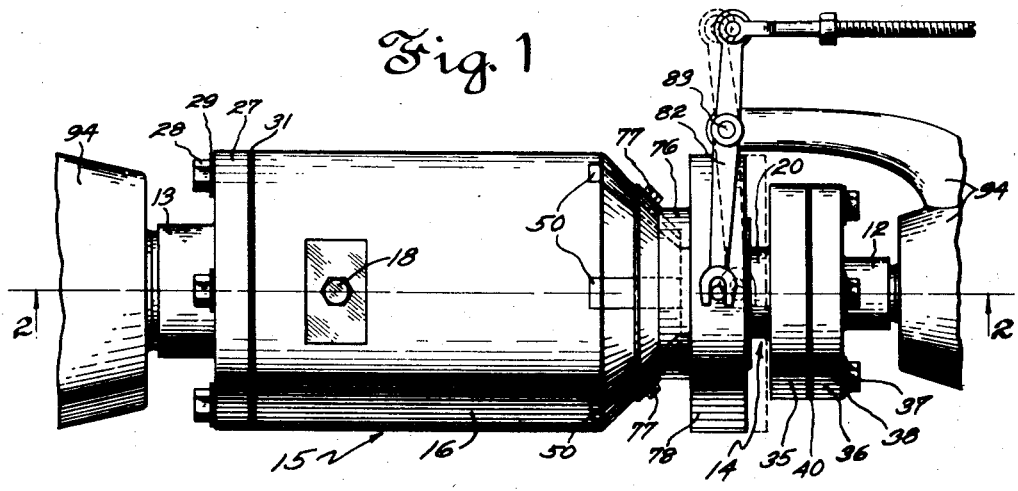
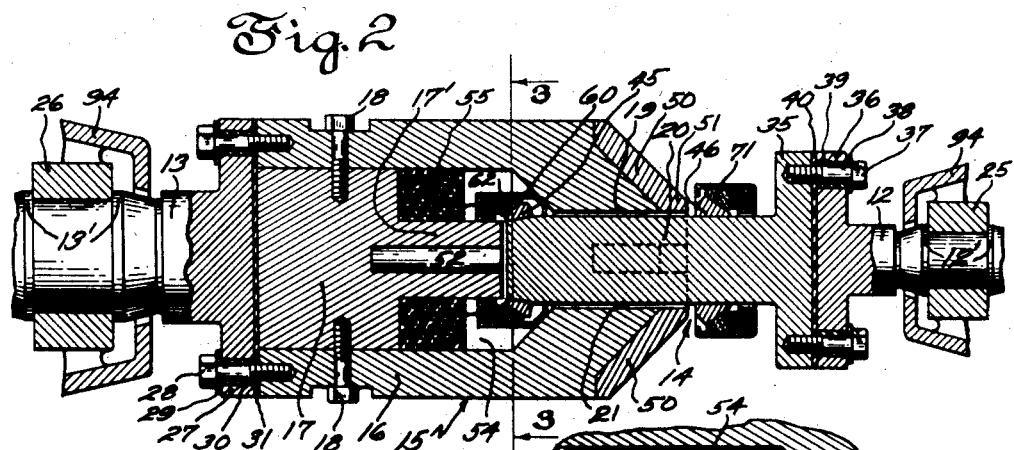
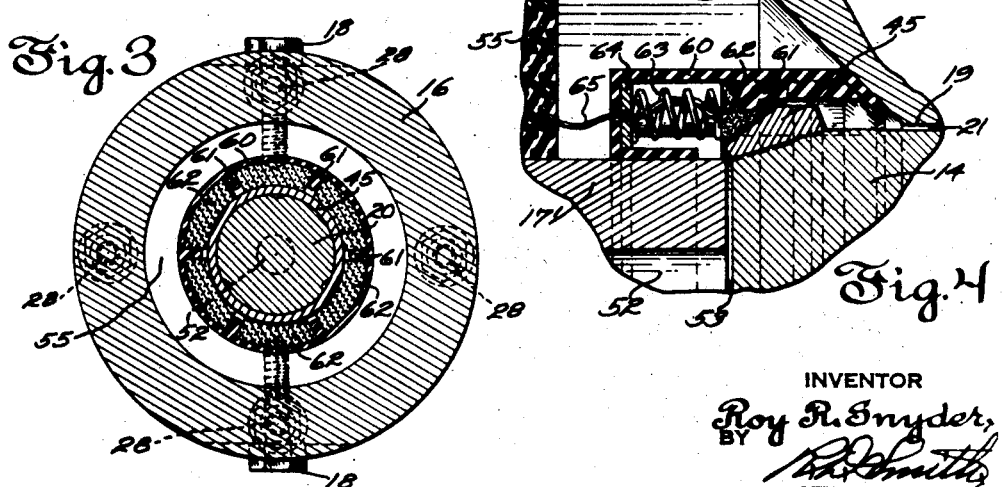
INVENTOR
Roy R. Snyder,
BY
ATTORNEY Dec. 6, 1949
R. R. SNYDER
2,490,554
TRANSMISSION OF ROTARY MOTION BY SINGLE HOMOPOLAR DYNAMOELECTRIC MACHINE
Filed Nov. 29, 1946
3 Sheets-Sheet 2
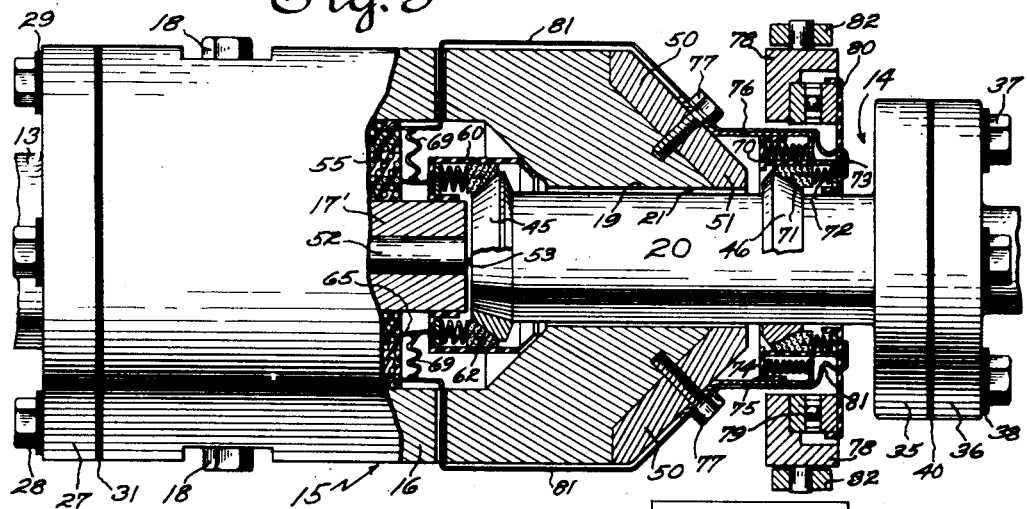
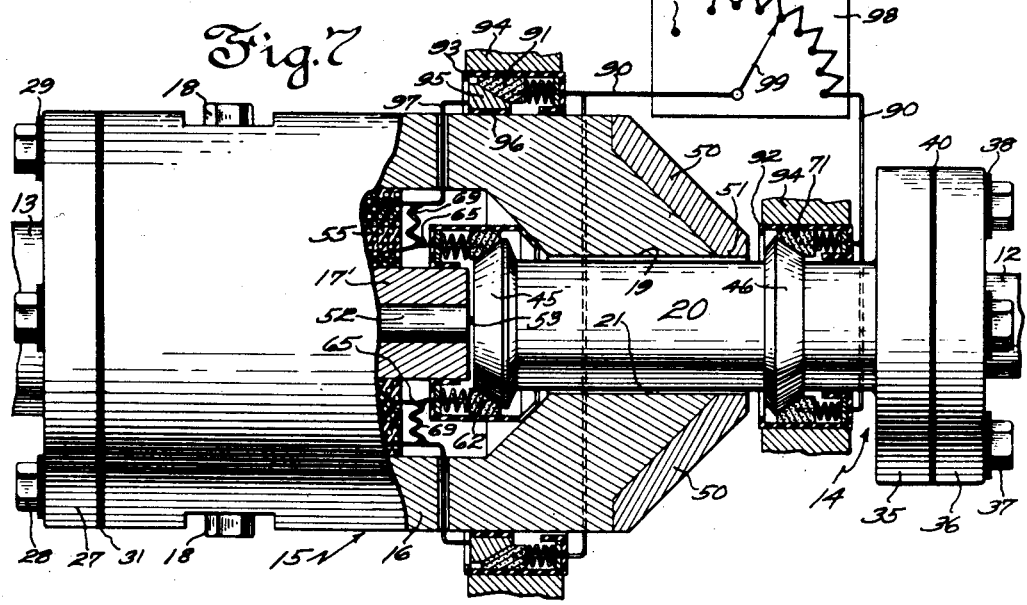
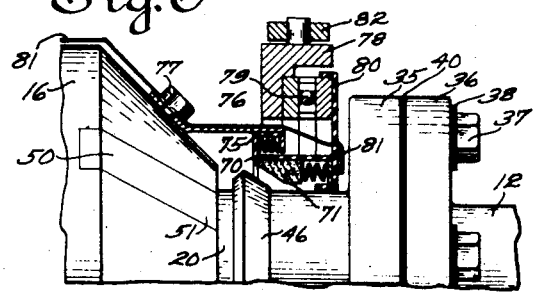
INVENTOR
Roy R. Snyder,
BY
ATTORNEY Patented Dec. 6, 1949

2,490,554

UNITED STATES PATENT OFFICE 2,490,554

TRANSMISSION OF ROTARY MOTION BY SINGLE HOMOPOLAR DYNAMOELECTRIC MACHINE

Roy R. Snyder, Augusta, Maine

Application November 29, 1946, Serial No. 712,996

20 Claims. (Cl. 172—284)

This invention relates to ways and means for effecting electromagnetically the transmission of rotary mechanical motion at variable speed ratios. In particular the present improvements provide an electromagnetic clutch-like transmission embodying a single homopolar dynamoelectric machine whose single armature and single field function respectively as the relatively turnable rotors of an electromagnetic clutch.

Former proposals to make use of homopolar dynamo-electric apparatus for transmitting mechanical power have assumed that dynamo-electric apparatus when employed for this purpose must include both a homopolar generator and a homopolar motor with dual armatures and with dual fields, the whole comprising at least two complete and cooperatively functioning homopolar machines. In former proposals one of these homopolar machines is connected to be driven mechanically by a prime mover and acts as a generator for electrically energizing the other homopolar machine which in turn acts as a motor to drive the load.

One object of the present improvements is to eliminate the expense and complication of such dual or compound homopolar apparatuses in change-speed transmission of mechanical power. They enable a single homopolar machine with a single armature and single field to serve the full purpose in this respect of dual or compound homopolar apparatuses with even greater efficiency. Among the resultant advantages are lower weight, lower initial cost, lower maintenance cost, decrease in overall apparatus size, increase of compactness and ruggedness of structure, and higher overall efficiency due to entire freedom from wasteful effects of vagrant magnetic flux and overlapping electrical fields common to dynamo-electric machines that employ in structural and magnetic intimacy a plurality of fields and/or a plurality of armatures. Obviously these advantages are even more pronounced in comparison with the more common use of mechanically coupled electric motor-generator sets of the various multiple-pole types in many of which the armature as well as the field carries electric windings.

A contributory object is to employ for the stated purpose a single homopolar dynamo-electric machine which is self-exciting.

A specific object of this invention is to be able to vary the speed of a slow driven load shaft with low power loss while the mechanically powered driving shaft rotates at a higher, and if desired a constant, speed.

Another object is to provide electromagnetic braking of the load motion and selective control thereof by mechanically reversing the rotary direction of load movement in relation to the direction of rotation of the above said slow driven load shaft.

Another object is to provide means to vary and control the torque characteristics as well as the speed characteristics of the load connected rotor of the electromagnetic transmission.

Another object is to reduce overall diameter and axial length of structure in such type of electromagnetic transmission including its contained field coil or coils.

Another object is to provide an electromagnetic unit capable of transmitting heavy power through rotary motion with the aid of an unusually low voltage electrical circuit thereby to reduce problems which otherwise confront the provision of adequate and durable electrical insulation in the transmission structure.

A further object is to produce an electromagnetic clutch capable of transmitting powerful mechanical torque from its mechanically powered shaft to its load connected shaft at low speeds of the latter without the use of speed reduction gears, such performance being desirable in automotive drives, ship propulsion, operation of machine tools of certain types, etc.

A further object is to utilize my improved electromagnetic transmission for reverse drive of a load shaft as well as for dynamically braking the speed thereof when desired.

A further object is to reduce windage losses as well as losses of flux strength that commonly arise in the magnetic tract of an electromagnetic transmission due to such vagrant effects as eddy currents, flux overlapping, flux leakage, etc.

A still further object is to avoid the use of liquid bodies such as mercury for conducting electric current between relatively rotating parts of the dynamo-electric machine.

There are many possible forms of embodiment of the principles of this invention some of which are illustrated, in part diagrammatically, in the appended drawings and referred to in following description having reference to the drawings wherein:

Fig. 1 is an elevation of an electromagnetic clutch embodying the present invention.

Fig. 2 is a view taken in section on the plane 2—2 in Fig. 1 looking in the direction of the arrows.

Fig. 3 is an enlarged view taken in section on the plane 3—3 in Fig. 2 looking in the direction of the arrows.

Fig. 4 is a still further enlarged fragmentary view showing details of the construction of one of the internally located current collecting brushes appearing in Fig. 2.

Fig. 5 is a further enlarged view taken in section on the plane 2—2 in Fig. 1 showing details of the electric control circuit and equipment that are external to the main rotor bodies of the clutch.

Fig. 6 is a fragmentary view showing the current collecting brushes of Fig. 5 in circuit breaking position.

Fig. 7 is a schematic view similar to Fig. 5 showing a modified arrangement of current collecting brush parts with circuit control means added.

Figure 8:
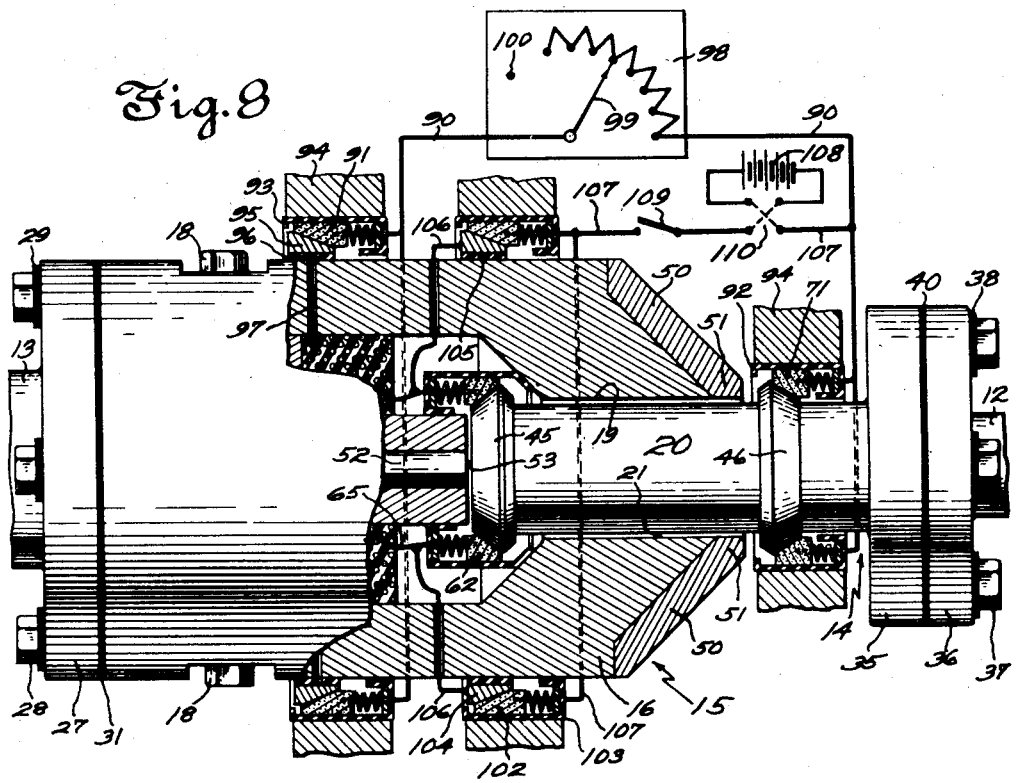
Fig. 8 is a schematic view similar to Fig. 7 showing the addition of still further current collecting brush parts with additional circuits and electrical equipment.

Uses of this improved electromagnetic clutch for such purposes as transmitting rotary power from a prime mover, such as a steam turbine (not shown) to a ship propeller (not shown), or from a machine-tool carried electric drive motor to the work operating spindle of the machine tool, call for relatively slow rotation of the load shaft 13 with forceful torque, and speedier rotation of the power shaft 12 with less torque. Hence the prime mover connected rotor 14 of the clutch may advantageously comprise structure having smaller overall diameter than the load connected rotor 15 of the clutch. For diametrical compactness and convenience of assemblage rotor 15 may comprise a thick walled tubular shell 16 plugged at its left end by a core body 17 fixed thereto by fastening screws 18 so that core body 17 rotates in unison with shell 16. The rigid structure 16, 17 is embraced in one of the rotors 15 of my improved electromagnetic slippage permitting clutch and is also the field core of a single homopolar dynamic-electric machine. A portion 17' of core body 17 is of reduced diameter to leave an annular space 54 for field windings 55 internally of shell 16. The extreme right end of the shell contains an axial bore 19 occupied by armature 20 of the said single homopolar dynamo-electric machine which is of size to leave only a narrow annular air gap 21. Armature 20 thus comprises the other rotor 14 of the electromagnetic clutch.

Coaxial relationship of the prime mover connected clutch rotor 14 and the load connected clutch rotor 15 is established by suitable stationary axially aligned rotor bearings 25 and 26 in which are respectively journaled in coaxial relation the aforesaid shafts 12 and 13. Thrust shoulders 12' fixed on shaft 12 prevent axial displacement of clutch rotor 14 by engagement with bearing 25 while thrust shoulders 13' fixed on shaft 13 prevent axial displacement of clutch rotor 15 by engagement with bearing 26. A flange 27 on driven shaft 13 is secured in mechanically fixed, electrically insulated relation to shell 16 by fastening bolts 28 which penetrate an insulative washer 29, an insulative bushing 30 and an insulative gasket 31 which combine to insulate load shaft 13 completely from both the shell 16 and the core body 17. Bolts 28 have threaded engagement with shell 16.

A flange 35 on armature 20 is fixedly secured to flange 36 on driving shaft 12 and in electrically insulated relation thereto by fastening bolts 37 which penetrate an insulative washer 38, an insulative bushing 39 and an insulative gasket 40 which combine completely to insulate flange 35 from flange 36. Bolts 37 have threaded engagement with flange 35.

Armature 20 is equipped with smooth conducting surfaces herein afforded by two current collector rings 45 and 46 fixed thereon in axially spaced relation. Ring 45 is located internally of shell 16 while ring 46 is axially external to shell 15. These collector rings may be of commutator grade copper and are bonded to the electrically conductive metallic body of armature 20 in constant full electric contact therewith, the body metal of armature 20 being of low magnetic reluctance.

The shell 16 of clutch rotor 15 is equipped with one or more permanent magnets 50 preferably embedded therein and each extending obliquely toward and bordering at one end on the bore 19 so that similarly polarized ends 51 of magnets 50 are separated from armature 20 by only the small annular air gap 21. One or more additional permanent magnets 52 is embedded, preferably centrally, in core body 17 extending axially of the latter with the end or ends thereof which are of polarity opposite to that of magnet ends 51 exposed and bordering on a small transverse air gap 53 which separates the left end of armature 20 from the right end of core body 17'. Core body portion 17' carries, and together with permanent magnet 52 is encompassed by, the aforesaid field winding 55, the latter consisting of an insulated electrically conductive coil or coils within the annular space 54 insulated from all core structure of the clutch rotor 15.

For completing an electric circuit between one end of field winding 55 and the relatively rotatable collector ring 45 a brush structure is employed whose details are most clearly shown in Figs. 3 and 4. An annular cage 60 of insulative material has fixed internally thereof circumferentially spaced, inwardly directed radial partitioning fins 61 and is fixed jointly on core body 17' and on field shell 16 of clutch rotor 15 within the annular space 54. Segmental brush blocks 62 which may be of carbon or other suitable brush material are slidable in an axial direction along fins 61, respectively, relatively to the cage 60. In their position shown in Fig. 4 they bear conductively and with negligible friction on the collector ring 45, being constantly thrust toward the right in Fig. 4 by compressed coils 63 of spring wire which may bear individually against each brush block 62 at one end and against an electrically conductive ring 64 in the cage 60 at the other end. Fig. 4 further shows that each brush block 62 may be in constant electrical connection with the end or common ends of the field winding 55 through flexible electric conductors 65 which pass through both the insulative cage 60 and the ring 64 and which may to advantage be in direct electrical connection to the latter thus enabling this conductive ring to equalize currents flowing through the various conductors 65.

For completing an electric circuit between the opposite end or ends of field winding 55 and collector ring 46 a variety of schemes of electric circuit forming equipment are illustrated in Figs. 5 to 8, inclusive. The simplest of these appears in Figs. 5 and 6 wherein is included circuit controlling means for only making and breaking an electric circuit for current flowing through winding 55 and armature 20. There is also, however, one or more insulated shunt conductors or resistors 69 of ohmic resistance properly proportioned to that of field winding 55 serving electrically to bridge the latter. The bridging conductor or conductors 69 thus serves to reduce the ohmic resistance to the flow of current through the armature and permits more current to flow in the armature between collector rings 45 and 46 than flows in the field winding 55. Higher ohmic resistance would otherwise be offered by the field winding alone.

In Figs. 5 and 6 an external cage 70 of insulative material is comparable with cage 60 in Fig. 4 in so far as it possesses radially directed circumferentially spaced partitioning fins like 61 and axially slidable segmental brush blocks 71 like the brush blocks 62 hereinbefore described, each correspondingly backed up by a yieldable spring coil 72 like spring 63 compressed between each brush block and a thin metallic ring 73 in cage 70. Cage 70 is centered coaxially of armature 20 by annularly extending mounting structure 76, or in lieu thereof by a circular series of stiff holding members serving the same purpose, so supporting cage 70 that the latter is permitted to shift bodily in an axial direction between its circuit making position shown in Fig. 5 and its circuit breaking position shown in Fig. 6. Cage holding structure 76 is fixed on clutch rotor 15 by fastening bolts 77 threading into shell 16. Cage 70 is normally urged toward the left to its said circuit making position in Fig. 5 by a suitable arrangement of spring coils 74 which are under compression between an outer cup-like annular rim 75, comprising a fixed part of cage 70, and the cage holding structure 76. Cage 70 has a stiff rim flange 80 to which is fixed one race of an axial thrust taking ball bearing 79 whose other race carries a shifter collar 78 that may be reciprocated axially by the swinging of a shifter yoke 82 about its frame pivot 83 in Fig. 1 so that collar 78, ball bearing 79 and cage 70 are shiftable in unison toward the right in Fig. 5 against the yielding resistance of springs 74. Also in Fig. 5 it is shown that the end or ends of field winding 55 opposite to the end or ends connected to brushes 62 are connected by flexible insulated conductors 81 respectively to the brush blocks 71 in the manner of wire 65 in cage 60.

Figure 9:
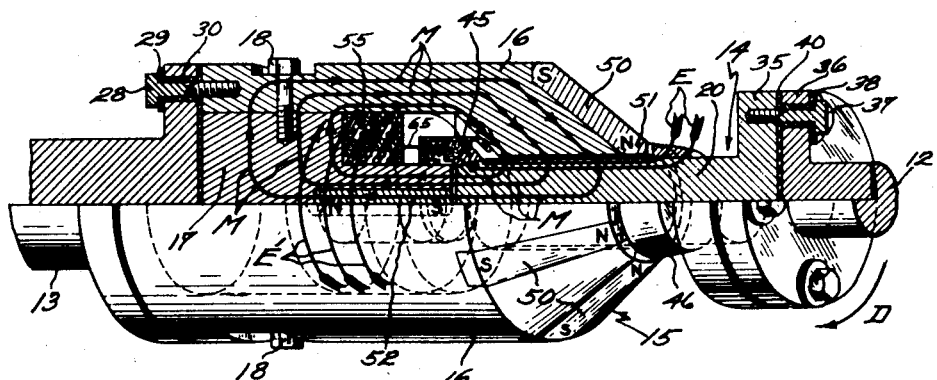
Fig. 9 is a diagrammatic view indicating certain paths and relationships of flow both of electric current and magnetic flux through metallic tracts of the clutch rotors.

The electromagnetic rotary coupling effected by the structure hereinbefore described viewed as a homopolar dynamo-electric machine involves a linkage of tracts of electric current flow with tracts of magnetic flux that are diagrammed in Fig. 9. Assuming rotation to be in the direction indicated by arrow D in Fig. 9 and permanent magnet ends 51 to constitute north poles while the end of permanent magnet 52 nearest armature 20 is a south pole, the arrow-pointed lines M designate the course of magnetic flux through field and armature of the homopolar machine, while the arrow-pointed lines E and E' designate the course of electric current flow through armature and field tracts when relative rotary movement takes place between clutch rotors 14 and 15. It is thus clear that clutch rotor 15 acts as the field section and clutch rotor 14 acts as the armature section of a single homopolar electric machine. The body metal of the cylindrical armature 20 has low magnetic reluctance and low electrical resistance whereby it provides not only an electrical conductive tract in armature 20 along the lines E of current flow that is revolvable in a circular orbit about the axis of armature rotation, but it also provides a looping tract or direction of magnetic flux along lines M in armature 20 which looping tract intersects the said orbit of revolution of the said electrical conductive tract.

In Fig. 9 it is also represented that the permanent magnets 50 on clutch rotor shell 16 all present, say, their north pole ends in a position closely facing a region of armature 20 on one side of the current tract E through said armature, while the permanent magnet 52 presents its end of opposite polarity (south pole) in a position closely facing a different region of armature 20 at an opposite side of said current tract E therethrough. It is further to be noted that the north pole and south pole ends of the field magnets are presented to armature 20 at respectively opposite ends of the armature tract M for magnetic flux, and on respectively opposite sides of current collector ring 45.

In the form of the apparatus disclosed in Figs. 1 to 6, inclusive, there will be no flow of current when the clutch rotors 14 and 15 are standing still. There will, however, be a path and flow of magnetic flux through armature 20 from the north pole ends 51 of permanent magnets 50 to the south pole end of permanent magnet 52 in the general direction of the lines of magnetic flux M in Fig. 9. Therefore when clutch rotor 14 is rotated by shaft 12 relatively to clutch rotor 15 in direction D in Fig. 9 the electrical conductive tract that extends from collector ring 45 to collector ring 46 along armature 20, designated by the two arrows E in Fig. 9, will revolve in an orbit which cuts the lines of magnetic force M. This serves to generate in an axial direction through the metal body of armature 20 a flow of current in a circuit which contains in electrical series not only the collector rings 45 and 46 but also the brush or brushes 62, the conductor or group of parallel conductors 69 bridging the field winding, the conductor or group of parallel conductors 81, and the group of brushes 71. Such flow of current will increase with every increase of speed of rotation of armature 20 relative to member 15. As this aggregate flow of current becomes greater that part of it which flows through field winding 55 will increase. This rise in flow of current through the field winding 55 in the direction of the group of three arrows E' in Fig. 9 will increasingly augment the strength of the magnetic flux already existing in the circuitous paths M so that the magnetic coupling between armature 20 and the field section 16 of my improved electromagnetic clutch will become forceful enough for transmission of heavy mechanical power while causing the clutch rotor 15 to rotate at some rotary speed lower than that of the clutch rotor 14. The rotary torque that the clutch is capable of transmitting becomes greater as the differential in rotary speed between rotors 14 and 15 increases. In other words the field section 16, 17 and 17' of the single electrodynamic machine becomes self-exciting as a mere result of relative rotation between clutch rotors 14 and 15 owing to the initiating magnetism in magnets 50 and 52 which exists at all times and assists any residual magnetism present respectively in body 20 and the united bodies 16, 17, 17' even at such small differential of clutch rotor speeds that little or no appreciable current flows in the field winding 55. All flow of electric current through the dynamo-electric circuits of the clutch can be terminated at any time by merely swinging the shifter yoke 82 from its full line position to its broken line position in Fig. 1. This displaces the brushes 71 from their position in Fig. 5 to their position in Fig. 6 and removes these brushes from circuit making contact with collector ring 46. Normally the mechanical springs 74 urge brushes 71 toward the left in Figs. 1, 5 and 6 into such conductive sliding contact with the collector ring.

There has been described in the foregoing the construction and operation of relatively movable single sections, namely field and armature, of a single homopolar dynamo-electric machine capable of efficient service as a combined clutch and change-speed transmission in which the control of the speed and torque characteristics of the transmission of rotary power is confined to simple making and breaking of an electric circuit. This electrically and mechanically simple organization may be elaborated in many ways, for example, so as to include not only means for making and breaking a self-exciting field circuit but also for modulating a self-generated current flow through the clutch rotors as illustrated in Fig. 7. The electric circuit that is external to the clutch in this instance comprises a stationary conductive line 90 serving to connect electrically the non-rotating brush blocks 71 to an additional circular series of brush blocks 91. The cage 92 of brushes 71 as well as cage 93 of brushes 91 will be fashioned after the hereinbefore described brush cage 60 and is likewise made of insulating material but will be fixed on and supported by stationary frame structure 94 concentrically with the axis of rotation of the clutch rotor. A collector ring 95 of good conductive material and wearing qualities such as commutator copper is fixed on and insulated from field shell 16 through the medium of an insulating bushing 96. An insulated conductor or conductors 97 of as heavy cross-section or aggregate cross-sections as the aggregate cross-sections of all parallel windings in the field 55 connects collector ring 95 to the opposite end of the field winding 55 from that end which is connected to brushes 62. A suitable type of adjustable rheostat and cut-out switch 98 can be introduced in circuit 90 and stationed at any point, remote from the clutch if desired, to serve as manual means for not only making and breaking but also modulating the flow of current through the field winding 55 and armature 20.

Excessive flow of current through field winding 55 and armature 20, however, can be reduced or increased in finely graduated increments by means of the variable resistance rheostat 98 which also includes a circuit breaking station 100 for the current regulating arm 99 of the rheostat. Thus the electro-magnetic performance of the clutch both as to speed and torque transmitted from rotor 14 to rotor 15 becomes more fully under control of the operator.

Fig. 8 shows the addition of a still further set of brush blocks 102 in a cage 103 that is supported by said stationary frame structure 94. Brushes 102 will conduct current to or from the collector ring 104 which, like ring 95, is fixed on but insulated from the field shell 16 by means of the insulating bushing 105. Collector ring 104 is connected by an insulated conductor or conductors 106 with the brushes 62 and with the opposite end of field winding 55 from that end connected by conductor 97 with brushes 91. An additional circuit 107 stationed externally of the clutch will serve electrically to connect brushes 102 and 71. At any point, remote from the clutch if desired, a storage battery 108 may be inserted in circuit 107 for the optional purposes of energizing the field winding 55 thereby to cause the clutch to perform as a homopolar motor, or of being charged by the current generated in circuit 107 by the relative rotary movement of one of the clutch rotors relative to the other. In this organization the clutch can be made to serve either as a homopolar motor or as a homopolar generator.

The addition of battery circuit 108 in Fig. 8 to the circuit 90 of Fig. 7 permits current flowing in the axial tract E through armature 20 from collector ring 45 to collector ring 46 or vice versa to be intensified above that amount of current which would flow in the same tract as a mere result of residual magnetism assisted by permanent magnets 50 and 52 and without depending on build-up of current flow by an increasing differential of relative rotary speed between clutch rotors 14 and 15. Conversely, when electromotive force becomes developed between collector rings 45 and 46 sufficient to overcome the potential of battery 108, a reverse current can be made to flow through said battery and thus serve to recharge the same. The amount of this battery charging current delivered to battery 108 remains under control of the adjustable rheostat 98. It will be understood that if either of clutch rotors 14 or 15 is made to stand still while the other rotates, the clutch and its electrical system of Fig. 7 may be made to operate as a generator of usable electric current flowing in circuit 90, whereas the clutch and its electrical system of Fig. 8 may be made to operate either correspondingly as a generator or alternatively as a motor under electrical energy furnished to circuit 90 or 107 from a source such as 108. These various possible functions of battery 108 in circuit 107 may be put under selective control of a circuit making and breaking switch 109 and/or a reversing switch 110 adapted to reverse the polarity of battery 108 in circuit 107.

When there is no electric circuit completed that includes the armature metal between rings 45 and 46 no current can flow in the field windings 55 of Figs. 1 to 7, inclusive. But eddy currents may circulate in parts of the armature 20. Interaction of these eddy currents and the permanent magnets might result in an unwanted tendency of the load-connected member 15 of the transmission to rotate. Hence the magnetic strength of the permanent magnets 50 and/or 52 should not be great enough to cause such unwanted power transmission when no electromagnetic field exists.

With further reference to use of relative movement between the clutch sections for exerting an electromagnetic braking effect operative to check the momentum of the rotating load while the prime mover continues to rotate at undiminished speed, there is suggested the interposition of any conventional form of so-called reversing gear between clutch section 15 and the load. See for instance that illustrated and described in U. S. Patent No. 2,288,206. Specifically the load shaft 13 hereof may be broken into two sections, one shaft section corresponding to shaft 20 and the other shaft section corresponding to shaft 27 of the said patent.

The relative quantities and sizes of conductors diagrammatically represented in the drawings may be chosen at liberty in accordance with well understood practice in dynamo-electric machines, no conductor being made unduly small in cross section to accommodate without excessive heating the passage of all current capable of flowing to and through it. Thus if field winding 55 be composed of a plurality of separate field coils of fine wire whose terminals jointly feed into a common conductor or conductors, such conductor or conductors should have enough size or combined size to accommodate the aggregate of current flowing through the several field coils. While the conical surfaces of the various collector rings are herein shown to slope at different angles with respect to their axis of rotation, 45 degrees is a preferable abruptness of slope. The current collecting brush faces will preferably slope in conformity with the collector rings with which they contact.

In addition to the various electrical systems above described for deriving the advantages of this invention there are many possible variations thereof and of the structural features of this improved electromagnetic clutch which will be suggested by the present disclosure to those familiar with the art, wherefore the appended claims are directed to and intended to cover all equivalents of and substitutes for the parts and arrangements of the present disclosure which are fairly comprehended within the language of the claims.

I claim:

1. A rotary motion transmitting electromagnetic clutch having cooperative first and second rotors relatively turnable at respectively different speeds and constituting the single field section and the single armature section of a single homopolar dynamo-electric machine.

2. A rotary motion transmitting electromagnetic clutch as defined in claim 1, in which the said field section includes an electromagnetic field tract of low reluctance supplemented by permanent magnet faces of opposite polarity, one end of said field tract along with at least one of said permanent magnet faces closely flanking one region of said armature section, and the other end of said field tract along with at least one other of said magnet faces closely flanking a different region of said armature section, thereby to cause self-excitation of said homopolar dynamo-electric machine jointly by said field tract and said permanent magnet faces upon rotation of either of said clutch rotors relative to the other clutch rotor.

3. A rotary motion transmitting electromagnetic clutch as defined in claim 1, in which the said field section includes an electromagnetic field tract of low reluctance supplemented by faces of opposite polarity of at least one permanent magnet, each of the opposite ends of said field tract along with at least one of said permanent magnet faces closely flanking a different one of spaced regions of said armature section, said armature section including a magnetic tract of low reluctance constantly completing a path of magnetic flux simultaneously between said permanent magnet poles and between said opposite ends of the field tract.

4. A rotary motion transmitting electromagnetic clutch as defined in claim 1, together with at least one current collecting brush carried by one of the said rotors in face-to-face conductive sliding contact with the other of said rotors.

5. A rotary motion transmitting electromagnetic clutch as defined in claim 1, together with at least one current collecting brush carried by the said field section in face-to-face conductive sliding contact with the said armature section.

6. A rotary motion transmitting electromagnetic clutch as defined in claim 1, together with a current collecting brush carried by said first rotor in a manner to make sliding conductive contact with said second rotor, a field winding carried by and insulated from said first rotor, at least one conductor carried by and insulated from said first rotor connecting said brush electrically with said field winding, and means to complete a circuit containing in electrical series said brush said conductor and said field winding.

7. A rotary motion transmitting electromagnetic clutch as defined in claim 1, together with a current collecting first brush insulated from and revolvable with said first rotor in sliding conductive contact with one portion of said second rotor, a current collecting second brush insulated from and revolvable with said first rotor in conductive sliding contact with a different portion of said second rotor, at least one conductor carried by and insulated from said first rotor connecting said first brush in electrical series with said field winding, and means to complete a circuit containing in electrical series said first and second brushes said conductor and said field winding.

8. A rotary motion transmitting electromagnetic clutch as defined in claim 1, together with a current collecting first brush insulated from and revolvable with the said first rotor in conductive sliding contact with one portion of the said second rotor, a current collecting second brush insulated from and revolvable with the said first rotor in conductive sliding contact with a different portion of said second rotor, a field winding carried by and insulated from said first rotor, at least one conductor carried by and insulated from said first rotor connecting said brush in electrical series with said field winding, means to complete a circuit containing in electrical series said brushes said conductor and said field winding, and a manually operable shifter stationed aside from said rotors operative to move the said first brush into and out of conductive contact with said second rotor thereby to make and break the said circuit while said first and second brushes are revolving with said first rotor.

9. A rotary motion transmitting electromagnetic clutch having cooperative first and second rotors relatively turnable at respectively different speeds composed respectively of the single field section and the single armature of a single homopolar dynamo-electric machine, said first rotor carrying thereon in a manner to revolve in unison therewith circuit forming elements insulated therefrom comprising a current collecting first brush in sliding conductive contact with one portion of said second rotor, a field winding, a conductor connecting said first brush in electrical series with said field winding, a current collecting second brush in sliding conductive contact with a different portion of said second rotor, a conductor connecting said second brush in electrical series with said winding, a resistor conductively bridging said conductors in shunt relation to said winding, and permanent magnet faces of opposite polarity presented to said second rotor at respectively opposite sides of one of said brushes, whereby said rotors are rotatively coupled to turn at respectively differing speeds by magnetic flux derived jointly from said permanent magnet faces and from current in said winding and second rotor.

10. A rotary motion transmitting electromagnetic clutch as defined in claim 9, together with manually operable stationary mechanism operative to shift the said current collecting second brush into and out of conductive contact with the said second rotor thereby to make and break a circuit containing all of the said circuit forming elements.

11. A rotary motion transmitting electromagnetic clutch having cooperative first and second rotors relatively turnable at respectively different speeds composed respectively of the single field section and the single armature of a single homopolar dynamo-electric machine, said first rotor carrying thereon in a manner to revolve in unison therewith a current collecting first brush in sliding conductive contact with one portion of said second rotor a field winding in electrical series with said first brush and a current conductive ring forming a rotary electrical terminal of said field winding, there being a current collecting second brush stationed for sliding conductive contact with a different portion of said second rotor, and a current collecting third brush stationed for sliding conductive contact with said conductive ring, together with means to lead and regulate current flow from one to the other of said second and third stationary brushes thereby to modulate the forcefulness of electromagnetic coupling of said rotors.

12. A rotary motion transmitting electromagnetic clutch having cooperative first and second rotors relatively turnable at respectively different speeds composed respectively of the single field section and the single armature of a single homopolar dynamo-electric machine, said first rotor carrying thereon in a manner to revolve in unison therewith a current collecting first brush in sliding conductive contact with one portion of said second rotor a field winding in electrical series with said first brush and a current conductive ring forming a rotary electrical terminal of said field winding, there being a current collecting second brush stationed for sliding conductive contact with a different portion of said second rotor, and a current collecting third brush stationed for sliding conductive contact with said conductive ring, means to lead and regulate current flow from one to the other of said second and third stationary brushes thereby to modulate the forcefulness of electromagnetic coupling of said rotors, a source of electric current apart from said clutch, and means to connect said current source jointly to said field winding and said first brush in electrical series with said second brush.

13. In an electromagnetic clutch having coaxial rotors, current collecting devices carried by one of said rotors including a hollow annular cage of insulative material concentric with the common axis of said clutch rotors, a current conducting surface of conical nature concentric with said common axis on the other of said rotors, and at least one rigid current collecting brush block occupying and guidable by said cage in an axial direction into and away from current collecting slidable engagement with said conical surface.

14. In an electromagnetic clutch having coaxial differential speed rotors, current collecting devices as defined in claim 13, in which the said brush block has a face conically conforming to the said current collecting surface.

15. In an electromagnetic clutch having coaxial differential speed rotors, current collecting devices as defined in claim 13, together with resilient means occupying the said annular cage arranged to urge the said brush block constantly toward and against the said current collecting surface.

16. In an electromagnetic clutch having coaxial differential speed rotors, current collecting devices as defined in claim 13, in which there are a plurality of the said current collecting rigid brush blocks in circular arrangement concentric with the said common axis of said rotors, together with radially disposed insulative partitions fixed on the said cage separating said brush blocks in a manner to constrain the latter against rotation relatively to said cage.

17. In an electromagnetic clutch having coaxial differential speed rotors, current collecting devices as defined in claim 13, in which one of the said rotors is hollow and fixedly carries internally thereof the said annular cage.

18. In an electromagnetic clutch having coaxial differential speed rotors, current collecting devices as defined in claim 13, in which one of the said rotors is hollow and fixedly carries internally thereof the said annular cage, together with a field winding carried by said one of said rotors within the hollow thereof, and a conductor connecting the said brush block electrically with said field winding.

19. In an electromagnetic clutch having coaxial differential speed rotors, current collecting devices as defined in claim 13, together with stationary shifter means operatively related to the said annular cage constructed and arranged to move the latter axially together with the said brush block relatively to the said collecting surface while said cage rotates in unison with one of the said clutch rotors.

20. In an electromagnetic clutch having coaxial differential speed rotors, current collecting devices including a hollow annular cage of insulative material encompassing one of said rotors and stationed concentrically with the common axis of rotation thereof, a current conducting surface of conical nature concentric with said common axis encompassing fixed on and insulated from said one of said rotors, and at least one rigid current collecting brush block occupying and guidable by said cage in an axial direction into and away from current collecting slidable engagement with said conical surface.

ROY R. SNYDER.

REFERENCES CITED

The following references are of record in the file of this patent:

UNITED STATES PATENTS

| Number | Name | Date |
|---|---|---|
| 1,233,569 | Graemiger | July 17, 1917 |
| 1,504,109 | Erban | Aug. 5, 1924 |
| 1,635,319 | Gill et al. | July 12, 1927 |